United States Patent
Samra et al.

(10) Patent No.: US 6,970,830 B1
(45) Date of Patent: Nov. 29, 2005

(54) METHODS AND SYSTEMS FOR ANALYZING MARKETING CAMPAIGNS

(75) Inventors: Balwinder S. Samra, Leeds (GB); Oumar Nabe, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

(21) Appl. No.: 09/474,539

(22) Filed: Dec. 29, 1999

(51) Int. Cl.[7] .............................................. G06F 17/60
(52) U.S. Cl. ...................................................... 705/10
(58) Field of Search ........................................ 705/10

(56) References Cited

U.S. PATENT DOCUMENTS

| | | | |
|---|---|---|---|
| 5,721,831 A | | 2/1998 | Waits et al. |
| 5,774,868 A | * | 6/1998 | Cragun et al. ................. 705/10 |
| 5,930,764 A | | 7/1999 | Melchione et al. |
| 5,966,695 A | * | 10/1999 | Melchione et al. ........... 705/10 |
| 6,006,197 A | | 12/1999 | D'Eon et al. |
| 6,026,397 A | * | 2/2000 | Sheppard ........................ 707/5 |
| 6,061,658 A | * | 5/2000 | Chou et al. .................... 705/10 |
| 6,078,891 A | | 6/2000 | Riordan et al. |
| 6,236,977 B1 | | 5/2001 | Verba et al. |
| 6,240,411 B1 | * | 5/2001 | Thearling ....................... 707/5 |
| 6,285,983 B1 | | 9/2001 | Jenkins |
| 6,327,572 B1 | * | 12/2001 | Morton et al. ............... 379/900 |
| 6,334,110 B1 | | 12/2001 | Walter et al. |
| 6,430,539 B1 | * | 8/2002 | Lazarus et al. ................ 705/10 |
| 2002/0072951 A1 | * | 6/2002 | Lee et al. ...................... 705/10 |

FOREIGN PATENT DOCUMENTS

| | | | | |
|---|---|---|---|---|
| WO | WO 98/49640 | * | 11/1998 | ........... G06F 17/60 |
| WO | WO 98/49641 | * | 11/1998 | ........... G06F 17/60 |

OTHER PUBLICATIONS

Robert R. Jackson and Paul Wang; *Strategic Database Marketing*; 1996 Printing; Published by NTC Business Books, a division of NTC Publishing Group, Lincolnwood, IL USA, copyright 1994; pp. 26-31; 38-45; 86-87; 118-123; 130-135; 158-165; 172-185.

Edward L. Nash; *Database Marketing*, copyright 1993, McGraw-Hill, Inc., USA; pp. 41-43; 90-91; 128-137; 139-163.

Julie Bort; Data Mining's Midas Touch; *InfoWorld*; vol. 18, Issue 18, start p. 79; Apr. 29, 1996.

Richard Cross; Profiting from Database Marketing; *Direct Marketing*, vol. 54, Issue 5, start p. 24; Sep., 1991.

American Banker; Database Marketing: Improving Service and Profitability By Segmenting Customers; vol. 163, Issue 176, start p. 30A, Sep. 15, 1998.

\* cited by examiner

*Primary Examiner*—Tariq R. Hafiz
*Assistant Examiner*—Andre Boyce
(74) *Attorney, Agent, or Firm*—Armstrong Teasdale LLP (57) ABSTRACT

Methods and systems for analyzing the success of a marketing campaign by using campaign results and an original campaign database are disclosed. The method includes the steps of profiling results of the marketing campaign against a list of user defined dimensions (analytic models may be used to derive dimensions) and assigning a score to the results of the marketing campaign.

22 Claims, 8 Drawing Sheets

METHODS AND SYSTEMS FOR ANALYZING MARKETING CAMPAIGNS

BACKGROUND OF THE INVENTION

This invention relates generally to marketing and, more particularly, to methods and systems for identifying and marketing to segments of potential customers.

Typical marketing strategies involve selecting a particular group based on demographics or other characteristics, and directing the marketing effort to that group. Known methods typically do not provide for proactive and effective consumer relationship management or segmentation of the consumer group to increase efficiency and returns on the marketing campaign. For example, when a mass mailing campaign is used, the information used to set up the campaign is not segmented demographically to improve the efficiency of the mailing. The reasons for these inefficiencies include the fact that measurement and feedback is a slow manual process that is limited in the depth of analysis. Another reason is that data collected from different consumer contact points are not integrated and thus does not allow a marketing organization a full consumer view.

Results of this inefficient marketing process include loss of market share, increased attrition rate among profitable customers, and slow growth and reduction in profits.

BRIEF SUMMARY OF THE INVENTION

Methods and systems for analyzing the success of a marketing campaign are described. By using campaign results and an original campaign database the success of a marketing campaign can be determined. The method includes the steps of profiling results of the marketing campaign against a list of user defined dimensions, the dimensions may be derived using analytic models, and assigning a score to the results of the marketing campaign.

DETAILED DESCRIPTION OF THE INVENTION

Exemplary embodiments of processes and systems for integrating targeting information to facilitate identifying potential sale candidates for marketing campaigns are described below in detail. In one embodiment, the system is internet based. The exemplary processes and systems combine advanced analytics, On Line Analytical Processing (OLAP) and relational data base systems into an infrastructure. This infrastructure gives users access to information and automated information discovery in order to streamline the planning and execution of marketing programs, and enable advanced customer analysis and segmentation of capabilities.

The processes and systems are not limited to the specific embodiments described herein. In addition, components of each process and each system can be practiced independent and separate from other components and processes described herein. Each component and process can be used in combination with other components and processes.

Figure 1:
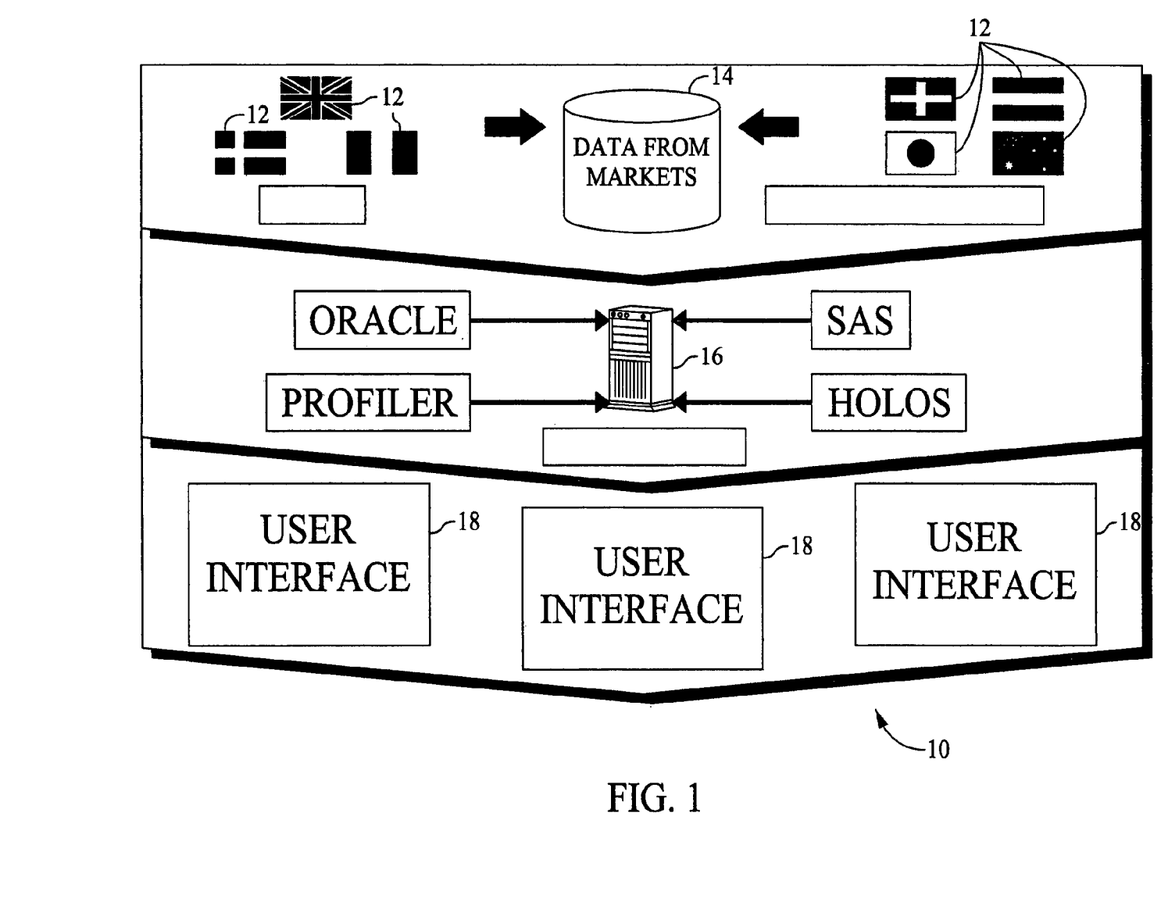
FIG. 1 is a block diagram of an exemplary embodiment of a web-based global modeling architecture.

FIG. 1 is a block diagram of an exemplary embodiment of a web-based global modeling architecture 10. Data from various international markets 12 is compiled in a consumer database 14. Consumer database 14 contains user defined information such as age, gender, marital status, income, transaction history, and transaction measures. Customer database 14 is accessible by a server 16. Server 16 stores the consumer database 14 in a relational database such that the consumer data is accessible to a targeting engine (not shown in FIG. 1) which takes data input and based upon modeling generates user interfaces 18. Architecture 10 may also be client/server based.

Figure 2:
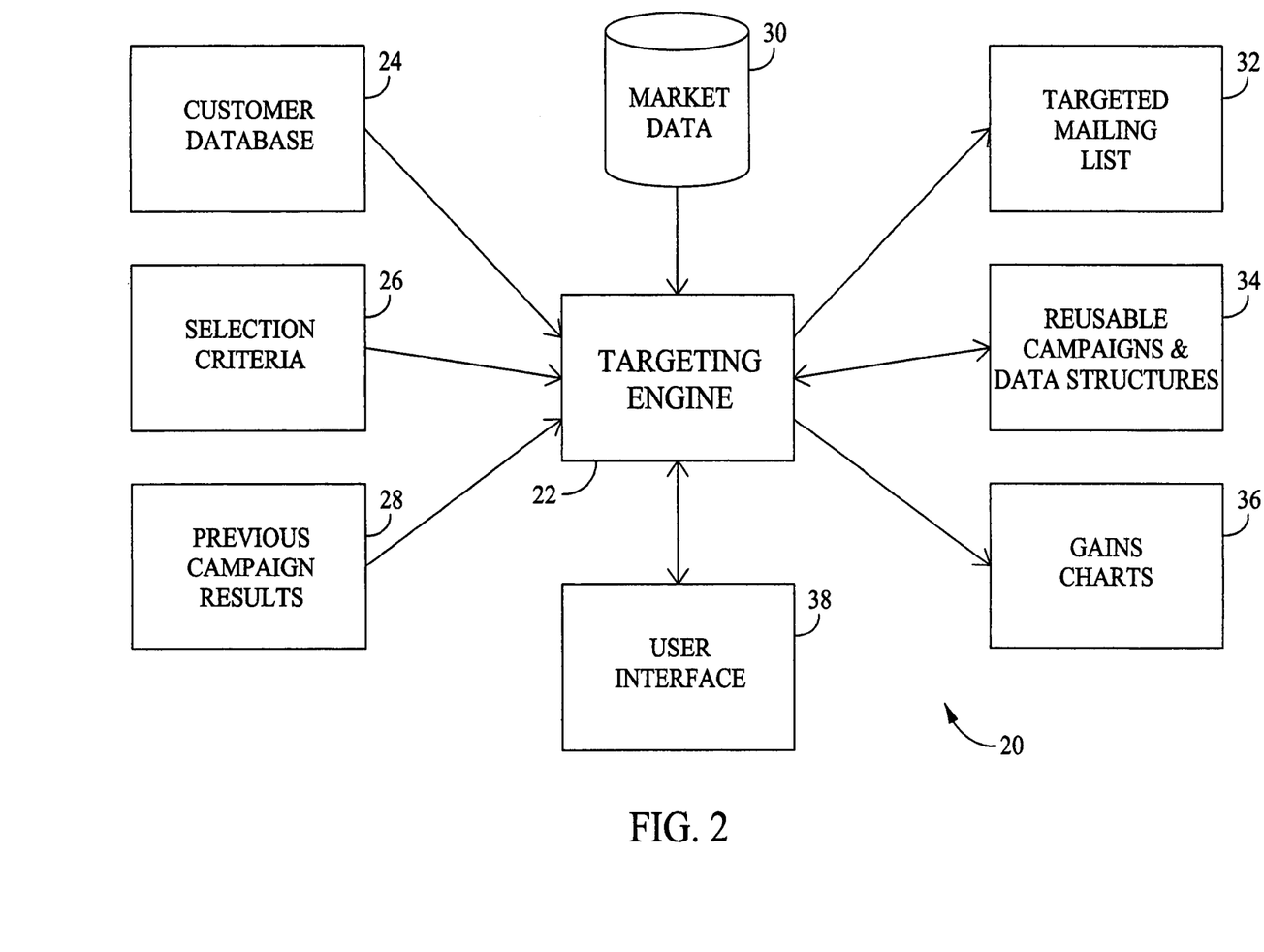
FIG. 2 is a block diagram of an exemplary embodiment of a targeting engine.

FIG. 2 illustrates a marketing system 20. Included in marketing system 20 are a targeting engine 22 and a plurality of data inputs and outputs. Data inputs include a customer database 24, selection criteria 26, previous campaign results 28 and marketing data 30. Targeting engine 22 generates targeting mailing lists 32, campaign and data structures 34 and gains charts 36. Historical campaign and data structures 34 are reusable by targeting engine 22. Targeting engine 22 also generates outputs to a user interface 38, typically in a graphic format. Targeting engine 22 streamlines the planning and execution of marketing programs and enables advanced customer analysis and segmentation capabilities. Targeting engine 22 further delivers information in a proactive and timely manner to enable a user to gain a competitive edge. Targeting engine 22 accomplishes these goals through the use of models.

Models

Models are predicted customer profiles based upon historic data. Any number of models can be combined as an OLAP cube which takes on the form of a multi dimensional structure to allow immediate views of dimensions including for example, risk, attrition, and profitability.

Models are embedded within targeting engine 22 as scores associated with each customer, the scores can be combined to arrive at relevant customer metrics. In one embodiment, models used are grouped under two general categories, namely marketing and risk. Examples of marketing models include: a net present value/profitability model, a prospect pool model, a net conversion model, an early termination (attrition) model, a response model, a revolver model, a balance transfer model, and a reactivation model. A propensity model is used to supply predicted answers to questions such as, how likely is this customer to: close out an account early, default, or avail themselves to another product (cross-sell). As another example, profitability models guide a user to optimized marketing campaign selections based on criteria selected from the consumer database 24. A payment behavior prediction model is included that estimates risk. Other examples of risk models are a delinquency and bad debt model, a fraud detection model, a bankruptcy model, and a hit and run model. In addition, for business development, a client prospecting model is used. Use of models to leverage consumer information ensures right value propositions are offered to the right consumer at the right time by tailoring messages to unique priorities of each customer.

Targeting Engine

Targeting engine 22 combines the embedded models described above to apply a score to each customer's account and create a marketing program to best use such marketing resources as mailing, telemarketing, and internet online by allocating resources based on consumer's real value. Targeting engine 22 maintains a multi-dimensional customer database based in part on customer demographics. Examples of such customer related demographics are: age, gender, income, profession, marital status, or how long at a specific address. When applied in certain countries, that fact that a person is a foreign worker could be relevant. The examples listed above are illustrative only and not intended to be exhaustive. Once a person has been a customer, other historical demographics can be added to the database, by the sales force, for use in future targeting. For example, what loan products a customer has previously purchased is important when it comes to marketing that person a product in the future in determining a likelihood of a customer response. To illustrate, if a person has purchased an automobile loan within the last six months, it probably is unreasonable to expend marketing effort to him or her in an automobile financing campaign.

However a cash loan or home equity loan may still be of interest to the automobile loan purchaser. In deciding whether to market to him or her, other criteria that has been entered into the targeting engine 22 database in the form of a transaction database can be examined. The transaction database contains database elements for tracking performance of previously purchased products, in this case the automobile loan. Information tracked contains, for example, how often payments have been made, how much was paid, in total and at each payment, any arrears, and the percentage of the loan paid. Again the list is illustrative only. Using information of this type, targeting engine 22 can generate a profitability analysis by combining models to determine a probability score for response, attrition and risk. Customers are rank ordered by probability of cross-sell response, attrition, risk, and net present value. For example, if a consumer pays a loan off within a short time, that loan product was not very profitable. The same can be said of a product that is constantly in arrears. The effort expended in collection efforts tends to reduce profitability.

When a marketer embarks on a campaign, they will input into targeting engine the desired size of the campaign. Using 60,000 as an example, the marketer inputs the target consumer selection criteria 26, some subset of the demographics listed above, into targeting engine 22.

Targeting engine uses the stored databases and generates a potential customer list based on scores based on demographics and the propensity to buy another loan product and expected profitability. Customers can be targeted by the particular sales office, dealers, product type, and demographic profile. Targeting engine enables a user to manipulate and derive scores from the information stored within the consumer and structure databases. These scores are used to rank order candidate accounts for marketing campaigns based upon model scores embedded within the consumer and structure databases and are used in a campaign selection. Scores are generated with a weight accorded the factors, those factors being the demographics and the models used. Using the scores and profitability targeting engine generates a list of potential profitable accounts, per customer and/or per product, in a rank ordering from a maximum profit to a zero profit versus cost.

Figure 7:
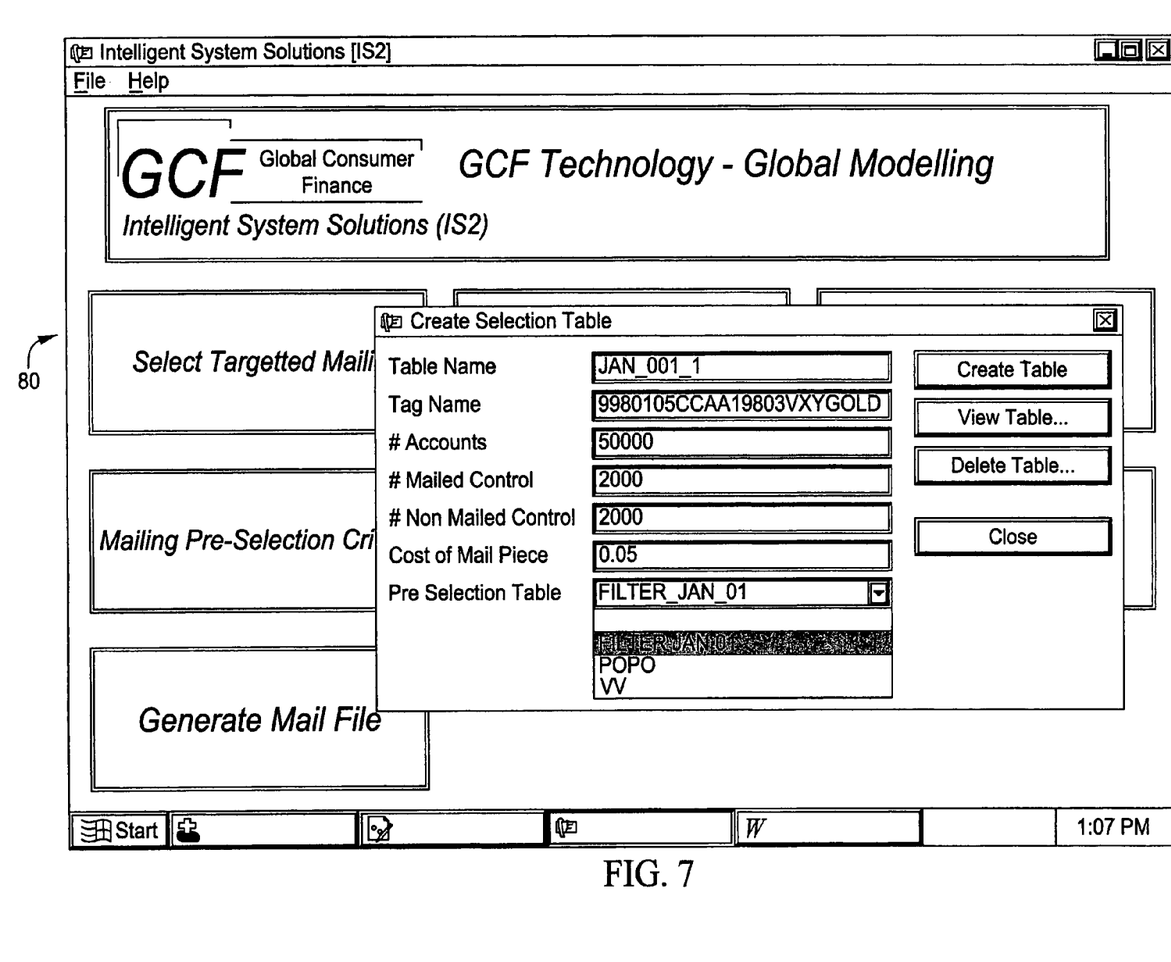
FIG. 7 is an exemplary user interface for creation of a selection table.

As candidate accounts are ranked by a selected model score, targeting engine 22 (shown in FIG. 2) performs calculations at which marginal returns become zero, and the user is alerted to an optimal mailing depth which can override initial manually selected campaign size to form a marketing campaign customer list. The selected marketing campaign results in a database table which has the customer identification number, relevant model scores, flags that indicate whether the customer is a targeted or a random selection, and an indicator for the product offered. As shown in FIG. 7, a user can use a user interface 80 to choose a particular database table. As an example, targeting engine 22 may determine that a mailing of 40,000 units, as opposed to the requested 60,000 units, is the maximum profitable for the example campaign. Conversely, targeting engine 22 may also determine that, for the requested campaign, 100,000 units have profit potential and will flag that information to the marketer. To arrive at expected profitability numbers, targeting engine 22, has the capability to deduct costs, such as mailing cost, from a proposed campaign.

Graphical User Interface

Figure 3:
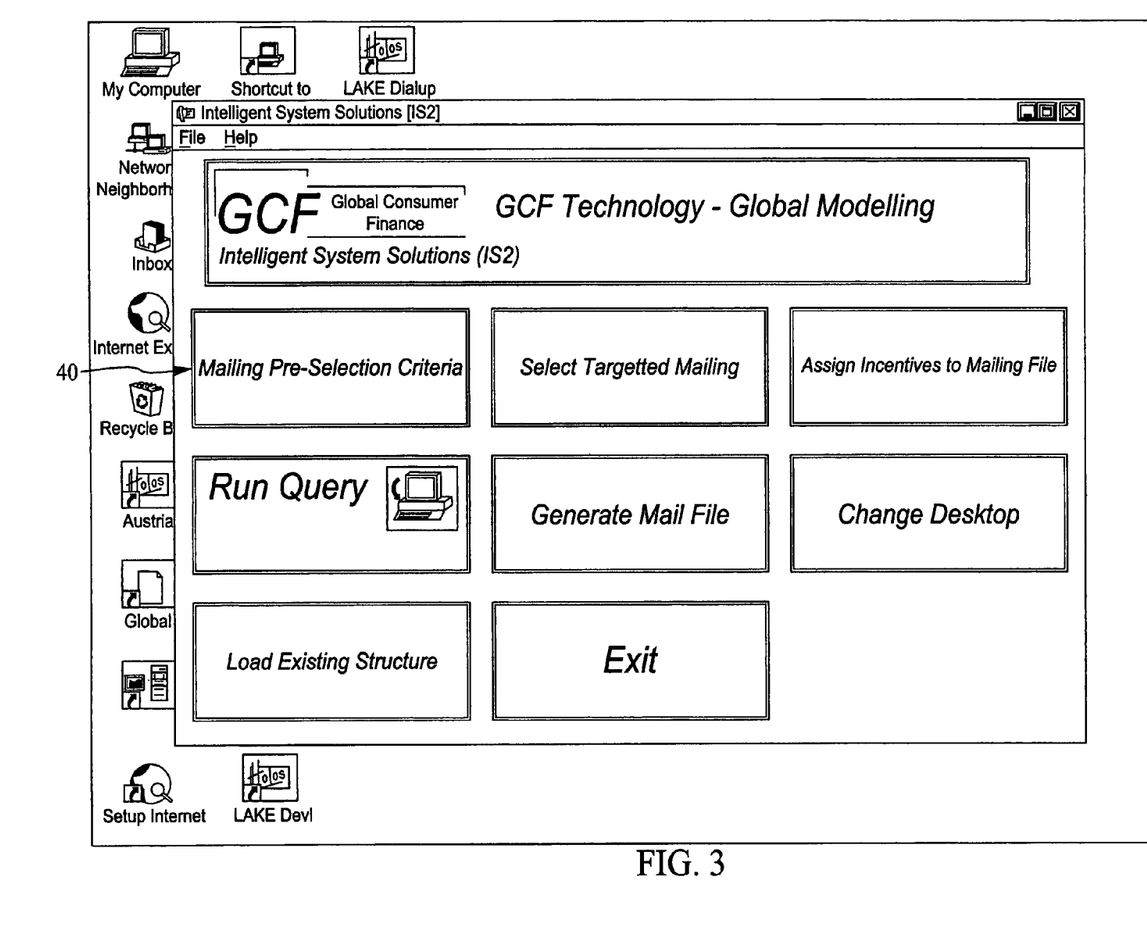
FIG. 3 is an exemplary graphical user interface for pre-selecting mailing criteria.
Figure 4:
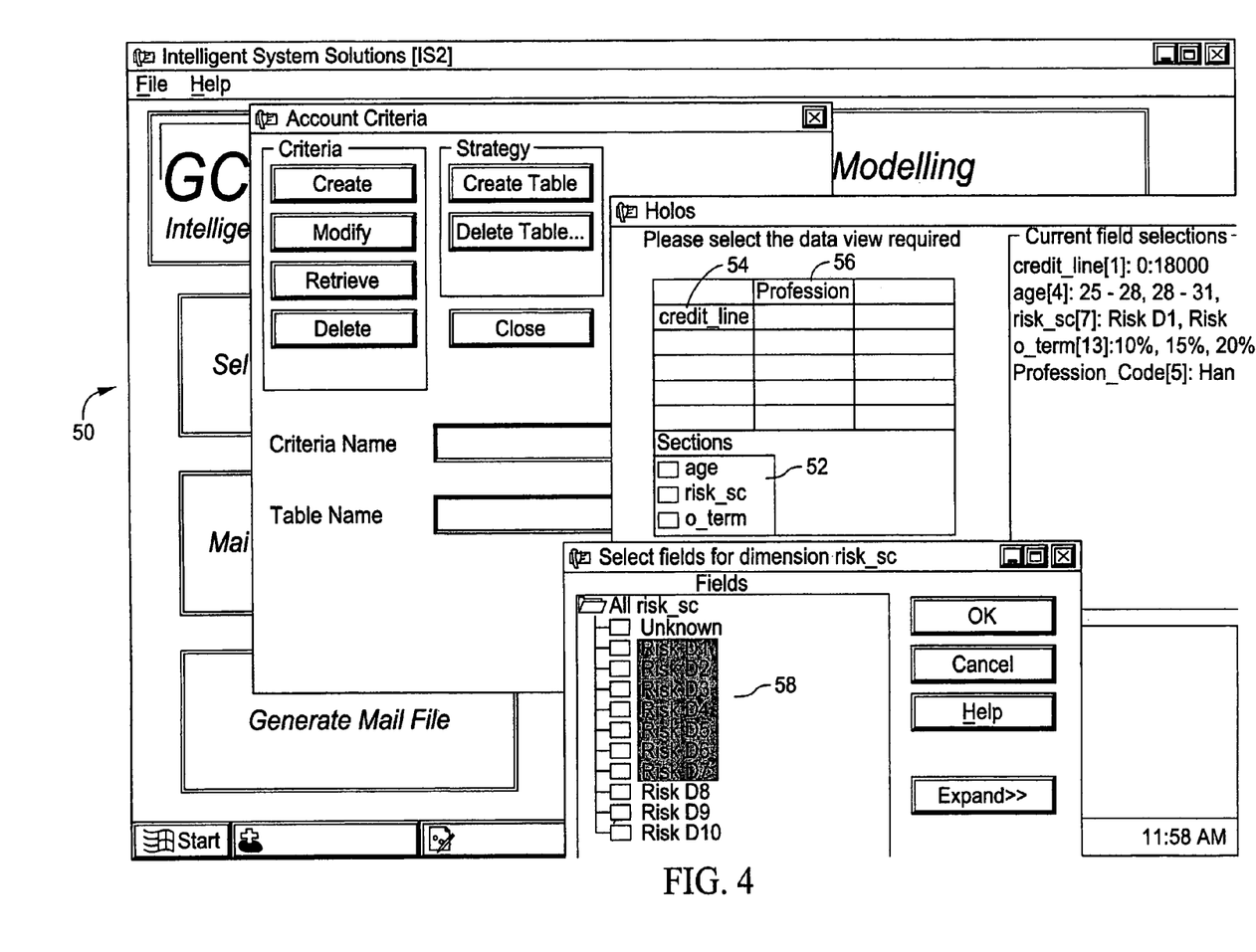
FIG. 4 is an exemplary user interface for the input of marketing criteria.

Users input the target consumer selection criteria 26 into targeting engine 22 through a simple graphical user interface 38. An exemplary example of a graphical user interface is shown in FIG. 3. In this exemplary example, one of the options available to a user is to input pre-selection criteria for a mailing campaign 40. Once the user selects the mailing pre-selection criteria 40 option, another user interface 50, one possible example is FIG. 4, allows the user to input the marketing criteria. Example marketing criteria shown are age 52, credit line 54, a profession code 56, and a plurality of risk factors 58.

Once a user has input the marketing campaign pre-selection criteria into targeting engine, that criteria is retained by a targeting engine database. Details of all available criteria are retained as entries in a database table and duplication of previous efforts is avoided.

Figure 5:
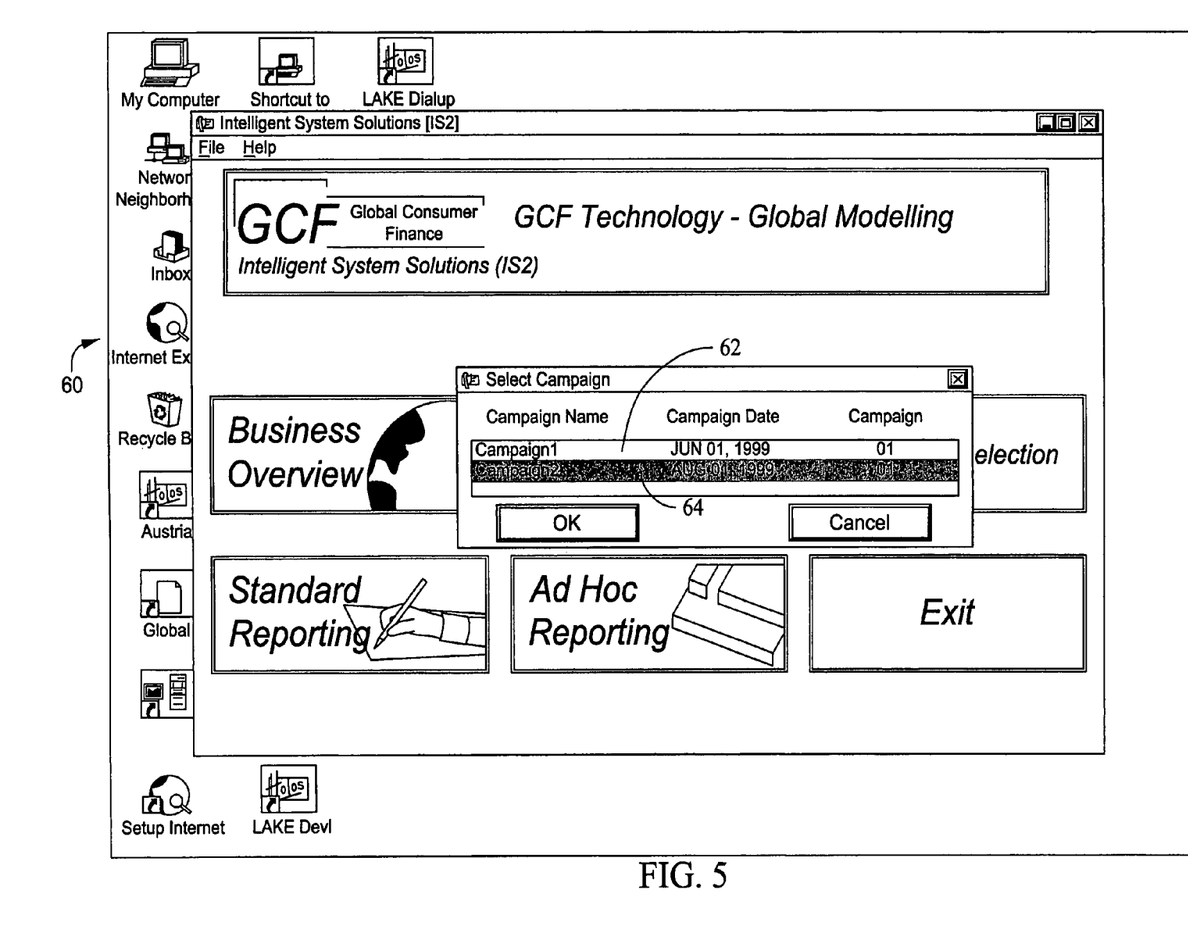
FIG. 5 is an exemplary user interface for selection of structures.
Figure 6:
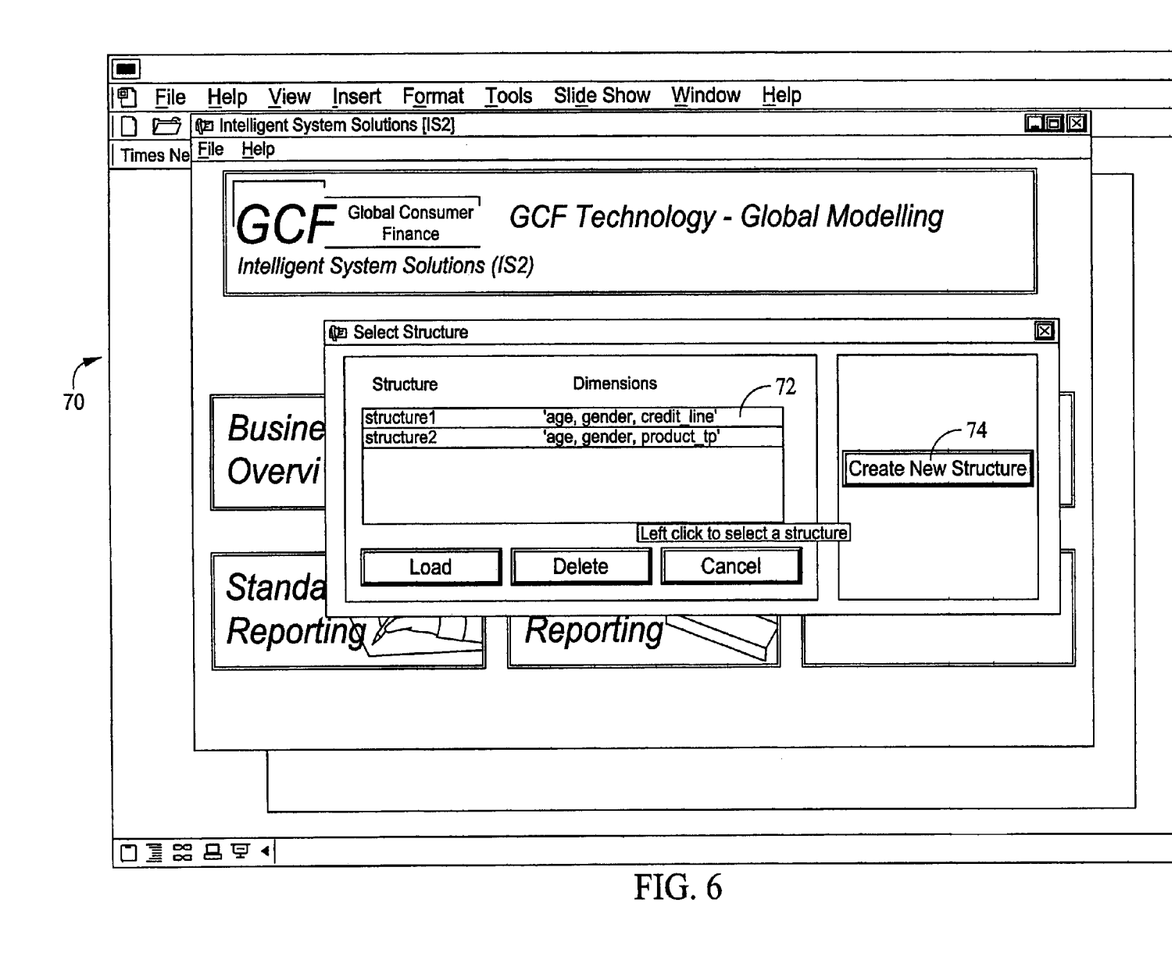
FIG. 6 is an exemplary user interface for selection of campaigns.

Marketing campaigns can be stored within targeting engine 22. An exemplary example showing a graphical interface 60 used to choose previous marketing campaigns is shown in FIG. 5. In this example, a user can choose between Campaign1 62 and Campaign2 64. FIG. 6 is a user interface 70 showing structures associated with Campaign2 64. Structure1 72 indicates that analysis of the campaign based on age, gender, credit line and the targeting model is available. Users can build new structures on an ad-hoc basis by choosing the Create New Structure 74 on user interface 70. By stacking structures of different campaigns in chronological order trends within segments can be discerned. As a result of the storage of marketing campaign structures within targeting engine database, those structures having time as one of the database elements allow a user to define trends whereby a marketing campaign history structure which is automatically analyzed by targeting engine 22.

Trend Analysis

A trend analysis is a way to look at multiple marketing campaigns over time and is also a way to evaluate the models used and define trends. As an example of trend analysis, the user can determine where a response rate has been changing or where profitability has been changing or look at the number of accounts being closed. A user can also analyze particular population segments over time.

Trend analysis can be used to track how a particular segment, males from age 25–35 with an auto loan for example, may change in a propensity to avail themselves to other loan products over time.

Campaign Analysis

A user can create marketing test cells in the targeted accounts. Test cells are created using a range of selection criteria and random assignments. Accounts satisfying selection criteria are counted. A marketing cell code for each account is assigned in the campaign table. The user can then output the contents of the campaign table to a file that can be exported to print a campaign mailing.

A user can profile selected accounts and assign a score for any campaign against a list of user defined dimensions. Assigning a score allows results to be rank ordered. Profiling shows how targeted accounts differ from non-selected accounts and is used to ensure the campaign is reaching the target base of the campaign. Profiling dimensions are selected during the initial customization process. Profiling can be done directly on a portfolio without any reference to marketing campaigns.

Targeting engine 22 also accepts marketing campaign results based upon each customer. Additional information can be appended onto the marketing campaign result files that become part of the consumer database. Exemplary examples of information that is added to the marketing campaign result files are: loan size, loan terms, and risk score. Campaign analysis is done by comparing the original marketing campaign customer list against marketing campaign results. Targeting engine 22 then profiles this comparison information to construct gains charts.

Maintaining feedback into targeting engine 22 improves subsequent modeling cycles. In the 60,000 example campaign explained previously, assume the size of the actual campaign after targeting engine applied a model was 40,000 mailings. Information regarding who responded and how much was lent, for example, is input into targeting engine. Analysis facilitates a determination of how good the model performed when it told the marketer 40,000 mailings was the optimal campaign size. Analysis is accomplished in one embodiment by the use of gains charts. As an example, the gains charts for the 40,000 mailings campaign may indicate that a mailing to 10% of the group may actually obtain 20% of all potential responders.

Figure 8:
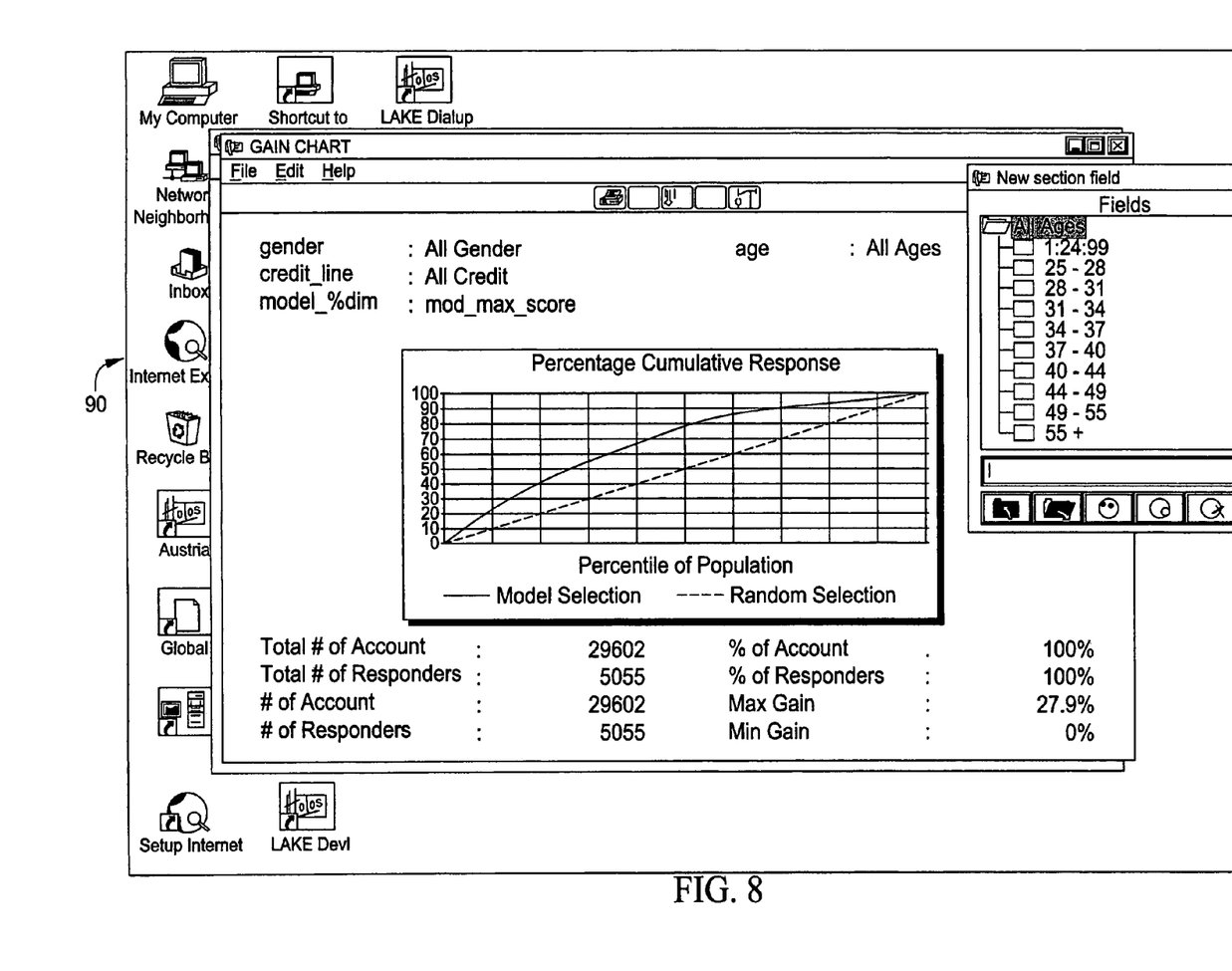
FIG. 8 is an exemplary user interface for a gains chart.

An exemplary gains chart is displayed on the user interface 90 shown in FIG. 8. As shown in FIG. 8, when models are used to generate prospective customers for a marketing campaign, a larger number of responses per campaign size is generated, thereby increasing the efficiency of the marketing campaign and identifying risks such as delinquency and fraud. A gains chart approach allows a user to track performance of models used over several marketing campaigns and therefore allows a user to show where the model works best and where the performance of the model need to be addressed.

Scores for customer accounts are generated as a part of a campaign analysis. Models are used to assign a score to an account as a result of a completed campaign.

While the invention has been described in terms of various specific embodiments, those skilled in the art will recognize that the invention can be practiced with modification within the spirit and scope of the claims. For example, although the above embodiments have been described in terms of a mailing campaign, the methods and systems described above are applicable to internet E-mail based campaigns and telemarketing campaigns.

What is claimed is:

1. A method of analyzing the success of a marketing campaign by using a targeting engine, campaign results and an original campaign database, said method comprising the steps of:

embedding within the targeting engine a plurality of analytic models including marketing and risk models, the marketing models including a net present value/profitability model, a prospect pool model, a net conversion model, an attrition model, a response model, a revolver model, a balance transfer model, and a reactivation model;

using the targeting engine to determine a sequential order for combining the models;

combining the models embedded within the targeting engine in the determined sequential order to define an initial customer group including a list of customers satisfying each of the combined models and rank ordered by projected profitability wherein projected profitability is based on a probable response by a customer to the marketing campaign, attrition of the customer, and risk associated with the customer, the list includes a high profit end, a moderate profit section, and a low profit end, the high profit end including customers having a highest projected profitability, the low profit end including customers having a lowest projected profitability, the moderate profit section including a profitability baseline, wherein the determined sequential order maximizes a number of customers included between the high profit end and the profitability baseline, a target group includes the customers included between the high profit end of the list and the profitability baseline, the profitability baseline defines marginal returns for a customer equal to zero;

deriving a list of user defined dimensions for the customers included in the target group, the user defined dimensions include marketing defined dimensions and risk defined dimensions;

profiling results of the marketing campaign against the marketing defined dimensions and the risk defined dimensions; and assigning a score to the results of the marketing campaign based on the marketing defined dimensions and the risk defined dimensions.

2. A method according to claim 1 wherein said step of profiling results of the marketing campaign further comprises the step of comparing accounts targeted by the marketing campaign against those accounts not targeted by the marketing campaign.

3. A method according to claim 2 wherein said step of comparing accounts targeted by the marketing campaign against those accounts not targeted by the marketing campaign further comprises the step of selecting the differences between targeted and non-targeted accounts.

4. A method according to claim 1 wherein said step of profiling results of the marketing campaign further comprises the step of ensuring that the marketing campaign is reaching a targeted population base.

5. A method according to claim 1 wherein said step of profiling results of the marketing campaign further comprises the step of capturing graphically, clusters of data built using statistical procedures.

6. A method according to claim 1 wherein said step of profiling results of the marketing campaign further comprises the step of using the user defined dimensions and the campaign result to construct a gains chart.

7. A method according to claim 1 wherein said step of assigning a score to the results of the marketing campaign further comprises the step of rank ordering user defined segments.

8. A method according to claim 7 wherein said step of rank ordering user defined segments further comprises the step of showing where the model works best.

9. A method according to claim 7 wherein said step of rank ordering user defined segments further comprises the step of showing where the model performance needs to be addressed.

10. A method according to claim 1 wherein said step of profiling results of the marketing campaign against the list of user defined dimensions further comprises:
comparing the results of the marketing campaign against the marketing defined dimensions and the risk defined dimensions; and
using the targeting engine to generate gains charts based on the comparison of the marketing campaign results against the marketing defined dimensions and the risk defined dimensions.

11. A method according to claim 1 wherein said step of embedding within the targeting engine a plurality of analytic models including marketing and risk models further comprises embedding within the targeting engine a plurality of analytic models including marketing and risk models, the risk models include a payment behavior prediction model, a delinquency model, a bad debt model, a fraud detection model, a bankruptcy model, and a hit and run model.

12. A system configured to analyze success of a marketing campaign, said system comprising:
a customer database comprising campaign results and an original campaign database;
a graphical user interface for presentation of campaign analysis data; and
a plurality of analytic models including marketing and risk models embedded within a targeting engine, the marketing models comprising a net present value/ profitability model, a prospect pool model, a net conversion model, an attrition model, a response model, a revolver model, a balance transfer model, and a reactivation model; said system configured to:
determine a sequential order for combining the models,
combine the models in the determined sequential order to define an initial customer group, the initial customer group includes a list of customers satisfying each of the combined models and rank ordered by projected profitability wherein projected profitability is based on a probable response by a customer to the marketing campaign, attrition of the customer, and risk associated with the customer, the list includes a high profit end, a moderate profit section, and a low profit end, the high profit end including customers having a highest projected profitability, the low profit end including customers having a lowest projected profitability, the moderate profit section including a profitability baseline, wherein the determined sequential order maximizes a number of customers included between the high profit end and the profitability baseline, a target group includes the customers included between the high profit end of the list and the profitability baseline, the profitability baseline defines marginal returns for a customer equal to zero,
derive a list of user defined dimensions including marketing defined dimensions and risk defined dimensions for generating a marketing campaign for the customers included in the target group,
profile results of the marketing campaign against said marketing defined dimensions and said risk defined dimensions, and
assign a score to the results of the marketing campaign based on said marketing defined dimensions and said risk defined dimensions.

13. A system according to claim 12 further configured to compare accounts targeted by the marketing campaign against those accounts not targeted by the marketing campaign.

14. A system according to claim 13 further configured to select differences between targeted and non-targeted accounts.

15. A system according to claim 12 further configured to ensure that the marketing campaign is reaching a targeted population base.

16. A system according to claim 12 further configured to capture graphically, clusters of data built using statistical procedures.

17. A system according to claim 12 further configured to construct gains charts from user defined models and campaign results.

18. A system according to claim 12 further configured to rank order user defined segments.

19. A system according to claim 18 further configured to show where the model works best.

20. A system according to claim 18 further configured to show where the model performance needs to be addressed.

21. A system according to claim 12 wherein said system is further configured to:
compare the results of the marketing campaign against said marketing defined dimensions and said risk defined dimensions; and
utilize said targeting engine to generate gains charts based on the comparison of the marketing campaign results against said marketing defined dimensions and said risk defined dimensions.

22. A system according to claim 12 wherein said risk models comprise a payment behavior prediction model, a delinquency model, a bad debt model, a fraud detection model, a bankruptcy model, and a hit and run model.

* * * * *